Figure 1:
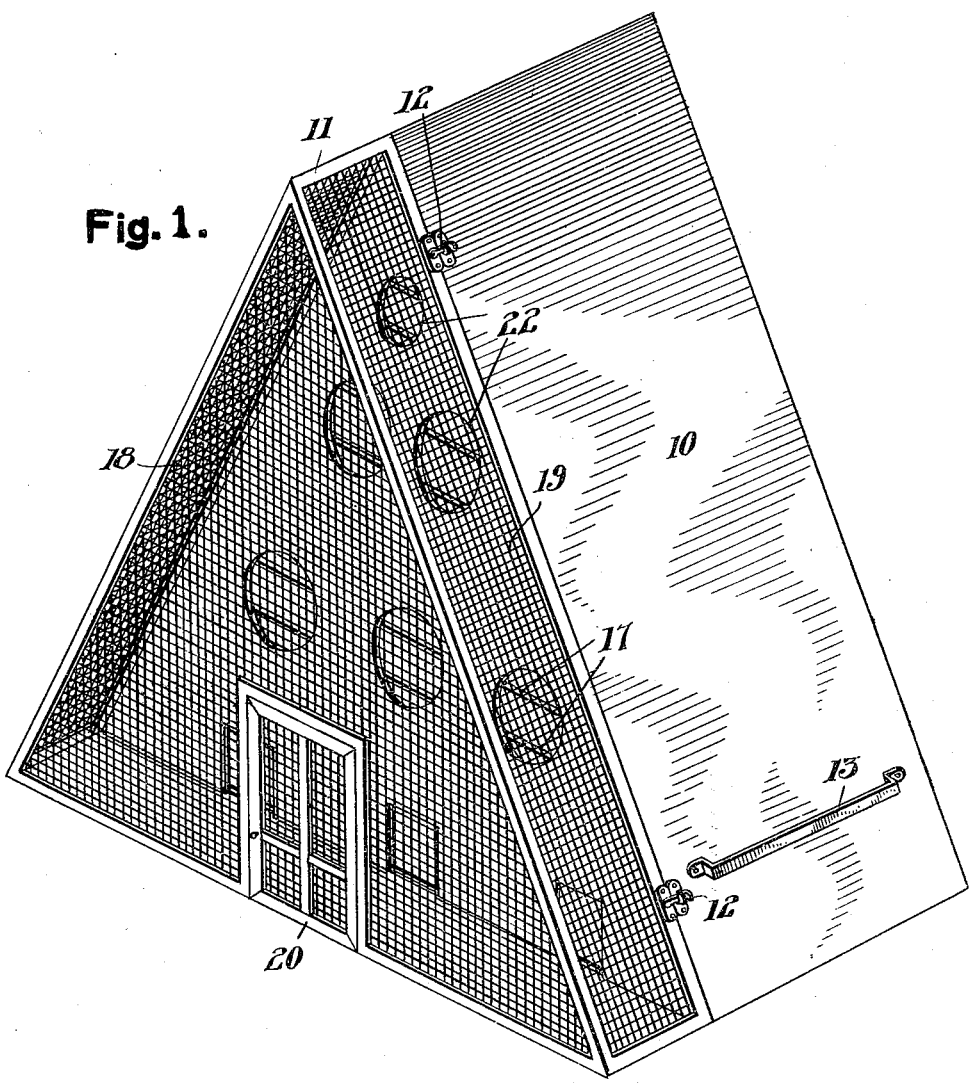

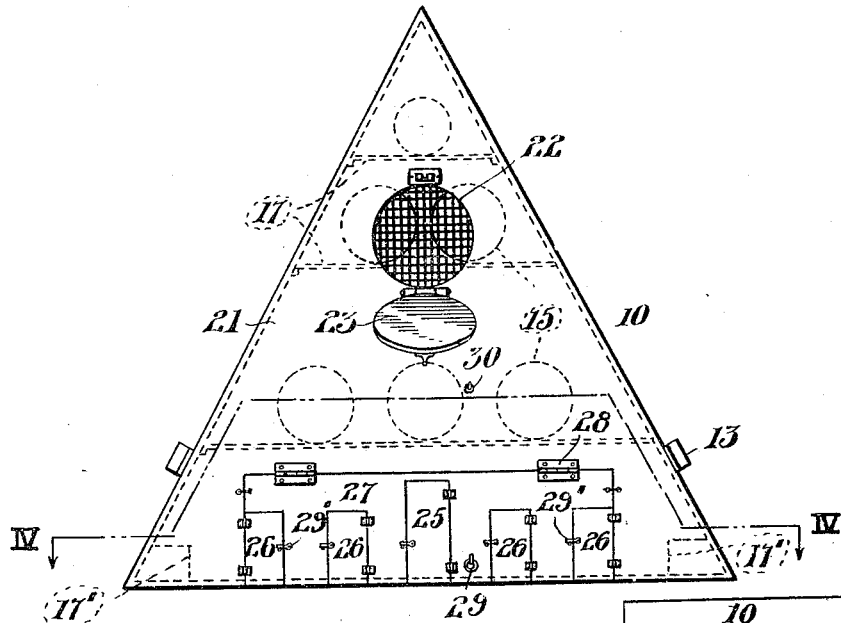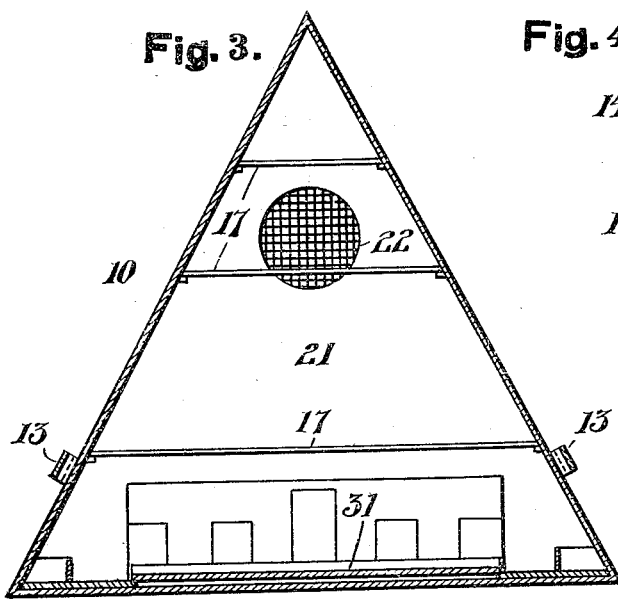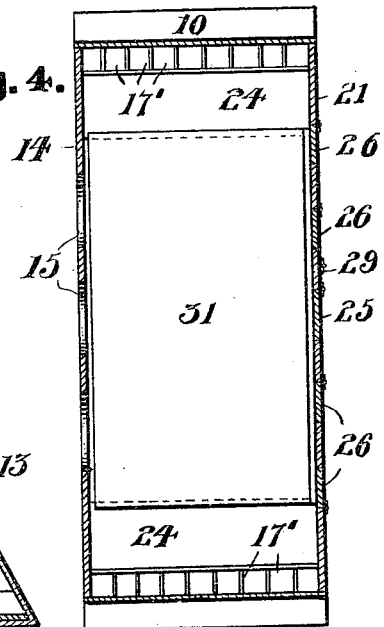

UNITED STATES PATENT OFFICE.

JOHN LISKA, OF OVID, MICHIGAN.

POULTRY-HOUSE.

1,137,411. Specification of Letters Patent. Patented Apr. 27, 1915.

Application filed July 22, 1914. Serial No. 852,468.

*To all whom it may concern:*

Be it known that I, JOHN LISKA, a subject of the Emperor of Austria-Hungary, residing at Ovid, in the county of Clinton and State of Michigan, have invented certain new and useful Improvements in Poultry-Houses, of which the following is a specification.

This invention relates to certain new and useful improvements in poultry houses.

The primary object of this invention is to provide a portable large-sized coop or house adapted to accommodate a flock of fowls and to provide a nesting and an exercising section.

A further object is to provide a portable poultry house having a detachable screened exercising section in connection with the nesting section thereof.

A still further object is to provide a poultry house with a plurality of doors carried by an upwardly-hinged side section and which section is openable for cleaning the house.

With these general objects in view and others that will appear as the nature of the invention is better understood, the same consists in the novel construction, combination and arrangement of parts hereinafter more fully described and then claimed.

In the accompanying drawings forming a part of this application and wherein like numerals of reference designate corresponding parts throughout the several views: Figure 1 is a perspective view of the device. Fig. 2 is a rear elevation thereof. Fig. 3 is a vertical central sectional view taken upon a plane longitudinally of the house floor, and Fig. 4 is a horizontal sectional view taken upon line IV—IV of Fig. 2.

Referring more in detail to the drawings, the invention broadly consists in the provision of a nesting section or cap 10 substantially triangular in vertical cross-section and having a similarly-shaped exercising section 11 removably secured thereto by means of a plurality of latches 12. Handles 13 are oppositely positioned upon the sides of the nesting section whereby the entire device is readily moved to different locations by lifting and carrying the same.

The front wall 14 of the section 10 is provided with a plurality of circular openings 15 and with lower square openings 16 adapted for allowing the fowls to readily enter the coop from the exercising section 11 while the coop is provided with a plurality of perches or roosts 17 and with rows of nests 17'. The exercising section 11 has an open rear side and is positioned abutting the front side of the coop as illustrated, while the front side 18 and the opposite inclined sides 19 are formed of a foraminous or screen material. A door 20 is provided in the front side 18 of said section 11. The rear side 21 of the coop is provided with an upper screened opening 22 having a closure door 23 for regulating the ventilation of the coop. The said rear side 21 of the coop is provided adjacent the coop bottom 24 with a central door 25 and with two smaller doors 26 upon each side of said door. The outer ones of the doors 26 are hinged to the rear side 21 of the coop while the central door 25 and the other two doors 26 are mounted upon the lower section 27 which is hinged as at 28 to said rear side 21. Each of the doors is provided with a similar latch or hook-retaining means 29'. From this construction, it will be evident that by opening the outer smaller doors 26, the section 27 may be moved upwardly upon its hinges 28 and the ring 29 carried by the section 27, positioned upon the hook 30 carried by the side 21 and thereby retaining the portion 27 in its open position and providing for the ready cleaning of the coop as well as allowing a movable bottom tray 31 to be easily withdrawn from the coop.

It will thus be seen that a portable poultry house is provided which may be constructed of any desired size and one in which a ventilated nesting and roosting coop is provided with a removable airing or exercising section. A run-way which is not illustrated may be placed at the rear of the coop or the poultry may be allowed to freely run outside of the coop by leaving open any desired number of the doors or even the hinged portion as may be found desirable.

While the forms of the invention herein shown and described are what are believed to be preferable embodiments thereof, it is nevertheless to be understood that various forms, modifications, and arrangements of the parts may be made without departing from the spirit and scope of the invention as claimed.

What I claim as new is:—

1. A poultry house comprising a pentahedron shaped coop, a lower hinged portion upon the rear coop side and having a plurality of doors carried thereby, and a tray positioned within said coop adjacent said hinged portion thereof adapted to be removed through the space occupied by the hinged portion.

2. A device of the class described, comprising a coop having a rear wall provided with a lower hinged section having door openings at the ends, means for retaining said section in its open position, and doors carried by said wall adapted for closing said openings when said section is in its closed position.

3. A device of the class described, comprising a coop having a rear wall provided with a lower hinged section having door openings at the ends, means for retaining said section in its open position, doors carried by said wall adapted for closing said openings when said portion is in its closed position, a plurality of doors carried by said hinged section, and a tray within said coop adjacent said hinged section of the rear side thereof adapted to be removed through the space occupied by the hinged section.

In testimony whereof I affix my signature in presence of two witnesses.

JOHN LISKA.

Witnesses:
O. C. C. Schulz,
Geo. G. Hunter.

Copies of this patent may be obtained for five cents each, by addressing the "Commissioner of Patents, Washington, D. C."